United States Patent
Nishida et al.

(10) Patent No.: US 8,064,461 B2
(45) Date of Patent: *Nov. 22, 2011

(54) METHOD AND APPARATUS FOR TCIP/IP DATA TRANSFER OVER A WIRELESS NETWORK

(75) Inventors: Yoshifumi Nishida, Santa Clara, CA (US); Atsushi Shionozaki, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/560,237

(22) Filed: Sep. 15, 2009

(65) Prior Publication Data
US 2010/0008342 A1    Jan. 14, 2010

Related U.S. Application Data

(63) Continuation of application No. 10/814,847, filed on Mar. 30, 2004, now Pat. No. 7,609,697.

(51) Int. Cl.
*H04L 12/56* (2006.01)

(52) U.S. Cl. ........ 370/394; 370/474; 714/746; 714/748; 714/751

(58) Field of Classification Search .................. 370/216, 370/231, 265, 338, 394, 473, 474; 714/746, 714/748, 751, 752
See application file for complete search history.

(56) References Cited

U.S. PATENT DOCUMENTS

| | | | |
|---|---|---|---|
| 6,445,717 B1 * | 9/2002 | Gibson et al. | 370/473 |
| 6,507,562 B1 * | 1/2003 | Kadansky et al. | 370/216 |
| 6,587,434 B1 | 7/2003 | Cousins | |
| 6,934,257 B2 | 8/2005 | Liu et al. | |
| 6,947,446 B2 | 9/2005 | LoGalbo et al. | |
| 7,096,405 B2 | 8/2006 | Kurobe et al. | |
| 7,174,386 B2 | 2/2007 | Cunningham et al. | |
| 7,315,515 B2 | 1/2008 | Pazos | |
| 7,376,091 B1 | 5/2008 | Eccles et al. | |
| 7,512,860 B2 * | 3/2009 | Miyazaki et al. | 714/751 |
| 7,609,697 B2 | 10/2009 | Nishida et al. | |
| 7,697,491 B2 * | 4/2010 | Nakajima et al. | 370/338 |
| 7,706,408 B2 * | 4/2010 | Takagi et al. | 370/473 |
| 2002/0120899 A1 | 8/2002 | Gahan et al. | |
| 2002/0120900 A1 | 8/2002 | Hong | |
| 2002/0150040 A1 | 10/2002 | Tong et al. | |
| 2003/0112820 A1 | 6/2003 | Beach | |

(Continued)

FOREIGN PATENT DOCUMENTS

JP    354160101 A    12/1979

*Primary Examiner* — Anthony Addy
(74) *Attorney, Agent, or Firm* — John P. O'Banion

(57) ABSTRACT

Systems and methods are described for increasing data transfer efficiency between networks. The invention being particularly well suited when establishing connectivity between wireless networks, such as based on IEEE 802 standards, and traditionally wired network protocols (often referred to as internet protocols), such as TCP/IP and UDP. The invention provides formatting of network packets and then processing of network packets according to one or more optimization processes. One optimization process comprises performing partial packet retransmissions to increase network efficiency, especially in high bit error rate networks such as wireless networks. Another optimization process comprises suppressing unnecessary packet acknowledgements, therein reducing burst traffic and saving substantial overhead in lossy networks. Additional aspects of the invention provide further benefits. The invention may be implemented within the MAC layer of a network interface, in particular within wireless network interfaces which are being increasingly utilized for both home and office short range interconnectivity.

39 Claims, 12 Drawing Sheets

U.S. PATENT DOCUMENTS

| | | |
|---|---|---|
| 2003/0152059 A1 | 8/2003 | Odman |
| 2004/0025018 A1 | 2/2004 | Haas et al. |
| 2006/0098616 A1 | 5/2006 | Kish et al. |
| 2006/0133379 A1 | 6/2006 | Krishnan et al. |

* cited by examiner

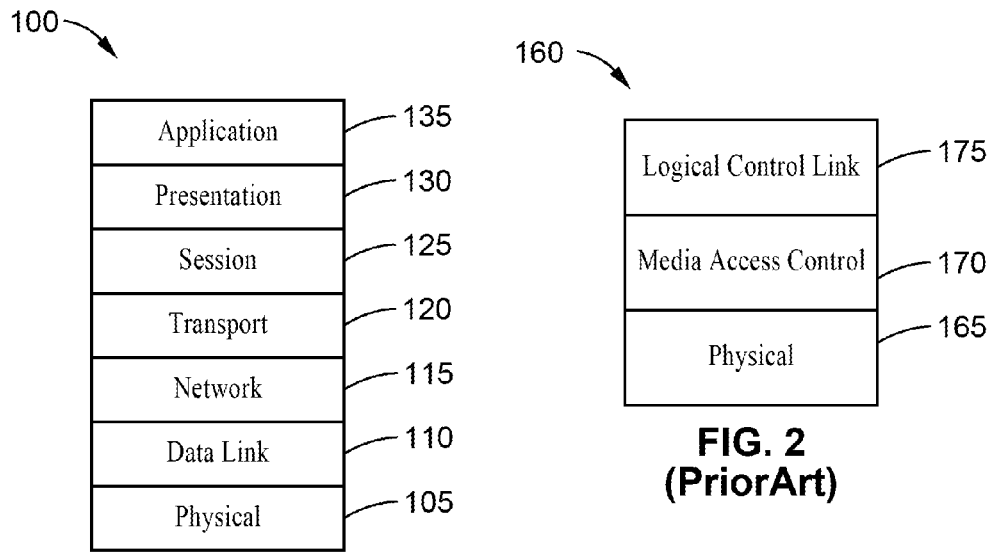
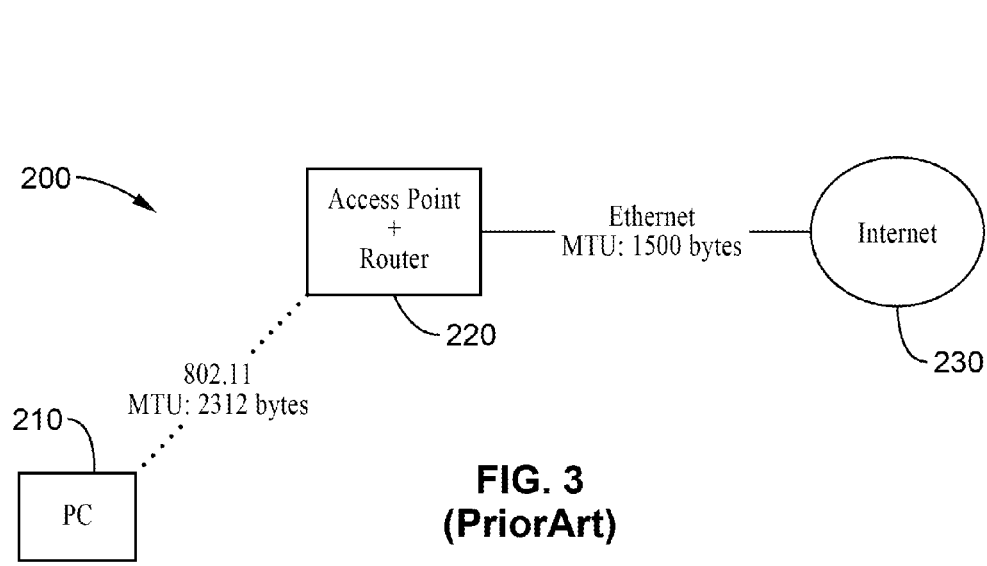

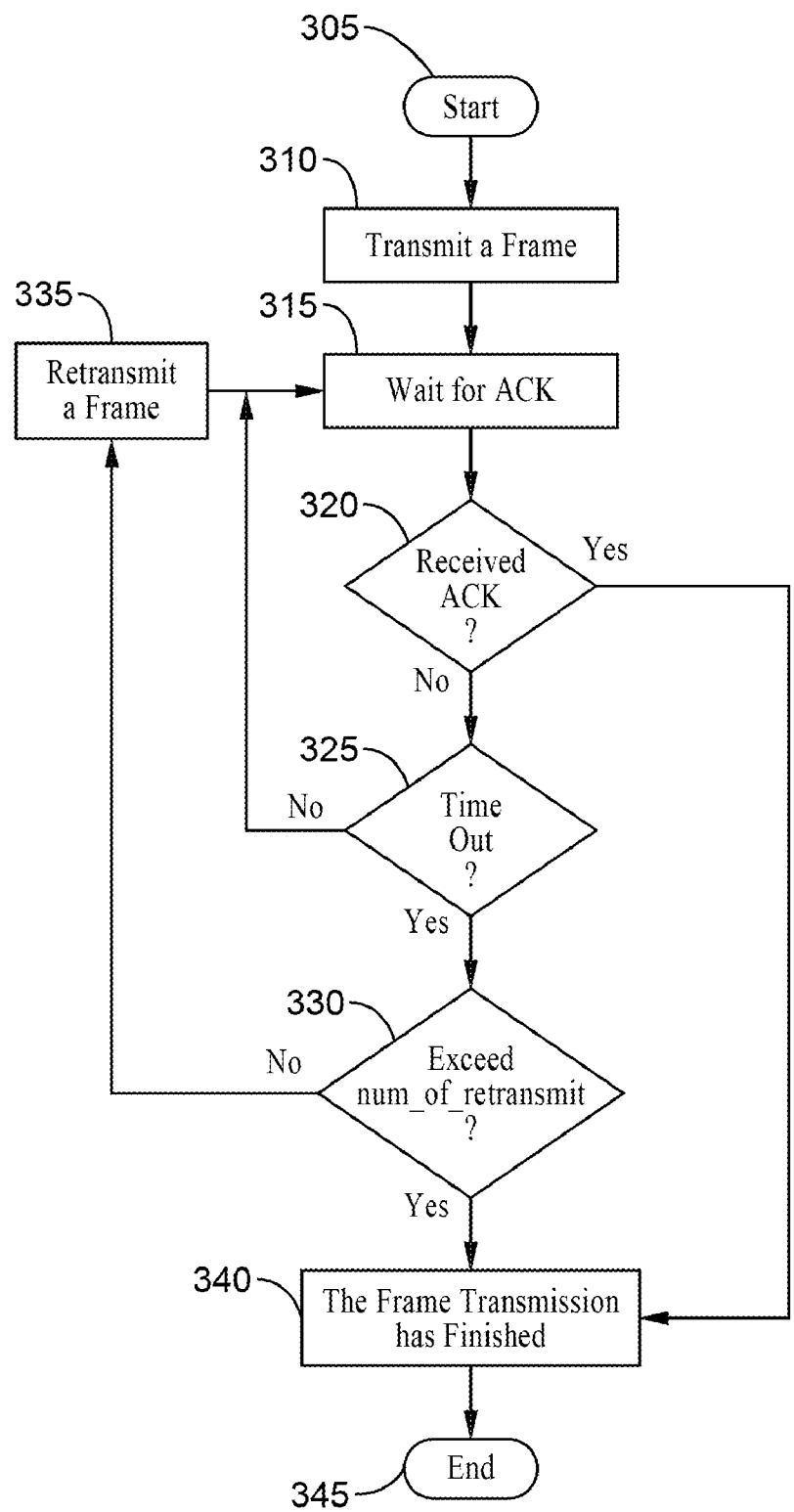
FIG. 5
(PriorArt)

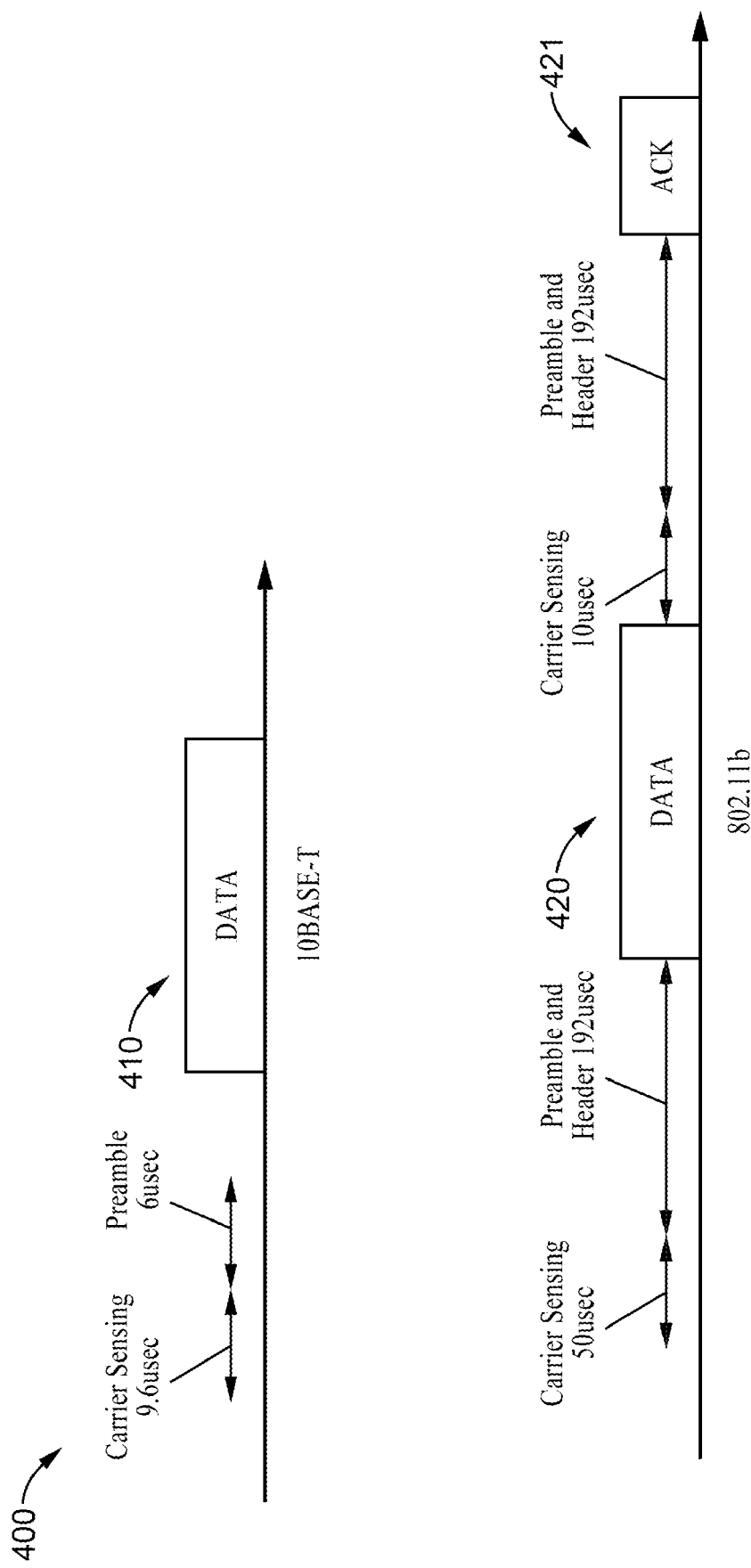
FIG. 6
(PriorArt)

METHOD AND APPARATUS FOR TCIP/IP DATA TRANSFER OVER A WIRELESS NETWORK

CROSS-REFERENCE TO RELATED APPLICATIONS

This application is a continuation of U.S. patent application Ser. No. 10/814,847 filed on Mar. 30, 2004, now U.S. Pat. No. 7,609,697,incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to communication data processing, and more particularly to optimizing wireless communication data processing.

2. Description of Related Art

The Open System Interconnection (OSI) standard provides a seven layered hierarchy between an end user and a physical device through which various network systems can communicate. Each layer is responsible for different tasks and the OSI specifies the interaction between layers while ensuring that the communication devices comply with the standard.

FIG. 1 shows the hierarchy 100 of the seven-layered OSI standard. As shown in the figure, the OSI standard includes a physical layer 105, a data link layer 110, a network layer 115, a transport layer 120, a session layer 125, a presentation layer 130 and an application layer 135.

The physical layer 105 conveys the bit stream through the network at the electrical, mechanical and functional level. It provides a hardware means of sending and receiving data on a carrier. The data link layer 110 provides the representation of bits on the physical medium and the format of messages on the physical medium, sending blocks of data, such as frames, with proper synchronization. The networking layer 115 handles the routing and forwarding of the data to proper destinations, while maintaining and terminating connections. The transport layer 120 manages the end-to-end control and error checking to ensure complete data transfer. The session layer 125 sets up coordinates, and terminates communications between applications. The presentation layer 130 converts incoming and outgoing data from one presentation format to another. The applications layer 135 is where communications, quality of service, user authentication, and so forth, are considered.

FIG. 2 illustrates a hierarchy 160 of the IEEE 802.11 wireless standard. Similar to the OSI standard, the IEEE 802.11 committee has developed a three layer architecture for wireless networks that roughly corresponds to the physical layer, the data link layer of the OSI standard. The IEEE 802.11 standard is typically implemented within network interface devices that communication with other network interfaces that are wireless or more preferably wired networks. As shown in the figure, the IEEE 802.11 standard includes a physical layer 165, a media access control (MAC) layer 170, and a logical link control layer 175. The physical layer 165 operates in a similar capacity as the physical layer in the OSI standard. The MAC layer and the logical link control layers share the functions of the data link layer in OSI standard 100. The logical link control layer 175 places data into frames that can communicate at physical layer 165, while MAC layer 170 manages communications over the data link sending data frames and receiving acknowledgment (ACK) frames. Together MAC layer 170 and link control layer 175 are responsible for error checking as well as retransmission of frames that are not received and acknowledged.

Wireless technologies have been integrated into our daily lives and are being required to provide not only connectivity, but also high performance, reliability and stable communications. The most dominant of the 802 wireless communication standard is IEEE 802.11 and its variants such as 802.11a, 802.11b, 802.11g which are being increasingly incorporated in various wireless products, such as personal computer interconnection.

FIG. 3 depicts an example in which an IEEE 802.11 network 200 in the home is utilized as the link between a personal computer 210 (i.e. remote PC, laptop PC, PDA, etc.) of a user and router 220 connected to the Internet 230. In this scenario, the IEEE 802.11 network becomes the first or last hop in the communication path. Furthermore, TCP/IP (Transmission Control Protocol/Internet Protocol) is used as the communication protocol for the entire communication path. However, using TCP/IP over IEEE 802.11 networks present some problems.

One of these problems involves the high overhead incurred with regard to frame retransmissions. It should be recognized that 802.11 networks have a high bit error rate (BER) on the order of $10^{-5}$, while a wired network like Ethernet has a very low bit error rate, on the order of $10^{-12}$. In order to provide reliable communications over lossy networks, IEEE 802.11 networks use automatic repeat requests (ARQ) to retransmit lost frames. Bit errors can be generated by resource contention of other nodes in the same IEEE 802.11 network or from other types of interference, such as multi-path radio effect. To avoid contention, a sender uses a back-off scheme that increases the wait time for retransmission exponentially. Thus, as more retransmissions occur, frame transmission time is delayed. Consequently, the communication performance of the IEEE 802.11 network is severely degraded when there is an increase in BER.

Another problem with the IEEE 802.11 network is that of self contention. A transport protocol such as the transmission control protocol (TCP) which provides high reliability communication uses acknowledgment (ACK) packets to confirm that the retransmitted packets have been received successfully. For TCP, one ACK packet is usually transmitted for every two data packets that arrive. This means that the number of transmitted ACK packets depends on the data transfer rate. These ACK packets contend with the data packets due to the half-duplex nature of 802.11 networks. This performance degradation is called self-contention and it typically reduces TCP performance by over 20% compared to communication in full duplex networks.

FIG. 4 illustrates a frame for a data packet according to the IEEE 802.11 wireless architecture. One of the problem with IEEE 802.11 wireless networks regards the frame size limits, wherein the specification allows for a frame size having a length of 2312 bytes, with a variable length frame body 240 of from 0 to 2312 bytes and a 4 byte FCS 260. Since IEEE 802.11 requires waiting a certain amount of time before and after frame transmission, the use of a larger frame size could perhaps improve performance. However, when TCP/IP is used on IEEE 802.11 networks, the maximum transmission unit (MTU) which indicates maximum number of bytes that can be transmitted in a single frame is set to 1500 bytes in most cases.

FIG. 5 is an illustration of frame transmission within a conventional IEEE 802.11 frame transmission scheme. According to the IEEE 802.11 standard, the sender waits for an ACK from the receiver to confirm that a frame was received successfully. If an ACK is not received within a certain period of time, the sender presumes the packet was lost in the network and tries to retransmit it. As shown in the figure, the number of frame retransmits (num_f_retransmit) indicates the maximum retransmission times for frames. This value is typically set to a value between six to eight in a normal configuration. The transmission scheme is executed starting at block 305, wherein a frame packet is then transmitted as per block 310. The sender then awaits 315 an acknowledgment, and determines whether an acknowledgment has been received as per block 320. If an acknowledgment of frame receipt arrives from the receiver confirming that a frame has been received, the sender completes the frame transmission as represented by block 340, completing the transmission operations in block 345.

If, on the other hand, the sender does not receive confirmation of a successful transmission of a frame, the sender determines whether the frame transmission has timed as shown in block 325. In response to a transmission time out, the sender determines whether the time out exceeds the number of frame retransmissions in block 330. If the sender determines that a particular frame transmission has exceeded the number of frame retransmissions, the sender completes the frame transmission as represented by block 340. Alternatively, if a frame retransmission does not exceed the number of retransmissions, as detected by block 330, the sender attempts to retransmit the frame as per block 335 while waiting for an acknowledgment from the receiver of a successful transmission.

FIG. 6 illustrates a comparison of overhead for a 10 Mbps Ethernet, 10Base-T, associated with transmission of data 410, with the overhead for IEEE 802.11b, associated with transmission of data 420. The difference in overhead is requirements is readily apparent.

As mentioned above, a IEEE 802.11 network is typically utilized for a single section, or "hop", within a communication path wherein the remainder of the path generally includes Ethernet having a 1500 byte MTU. To facilitate adjusting to other networks, the MTU of IEEE 802.11 is also set to 1500 bytes. It is possible for an IEEE 802.11 network to choose a large value for MTU, but it raises some issues. These issues may include in IP version 4 (IPv4), an IP packet being fragmented as it travels from a network with a large MTU to a network with a smaller MTU. Since packet fragmentation requires creating new IP and MAC headers for each fragment of the fragmented packet, this overhead may impact performance.

While IP packets are fragmented in IPv4, in IP version 6 (IPv6), IP packets are never fragmented. Packets are required to use the minimum MTU in the path determined by the path MTU discovery or the default MTU value: 1280 bytes. Thus, if the path contains a network with a smaller MTU, which is very common, a 2312 byte MTU will not be used.

Simply increasing the MTU size will not necessarily improve communication performance. Using a large MTU can reduce the effect of the overhead for frame transmission and it can lead to performance improvement under non-lossy environments. However, performance is drastically degraded under lossy environments, since a large MTU is more sensitive to bit error than a smaller one.

Therefore, it is desirable to provide a method by which wireless networks can communicate with other networks, specifically TCP/IP based networks, without the inherent problems of the conventional art. The present invention fulfills that need and optimizes network data processing between two network with different data transport protocols.

BRIEF SUMMARY OF THE INVENTION

The present invention generally allows the formatting of network data frame designated for communication in an IEEE 802 based wireless network to be formatted for transmission through a transport control protocol based network such as the Ethernet. The invention allows the use of an entire IEEE 802.11 frame as in the IEEE 802 specification, while maintaining the maximum transmission unit of an IP network.

The present invention provides one level of optimization by reducing the number of retransmissions of corrupted or unrecoverable data blocks between the sending nodes on one network and receiving nodes on the other network. The invention implements partial retransmissions of packet receipt acknowledgments between the sending node and the receiving node, thereby reducing the number of packets retransmissions in the event of a data block error in the packet.

The invention also describes a data formatting scheme that allows data frames meant for an IP network to be formatted using the IEEE 802 wireless specification. The data formatting of the present invention allows the sending node to attach unreceived data blocks from a prior packet transmission to subsequent packets transmitted to the receiving node. This method of attaching unreceived data blocks is a piggyback scheme which allows the present invention to determine whether an acknowledgment received by the sending node from the receiving node is a partial acknowledgment or a negative acknowledgment.

The invention also describes an acknowledgment suppression scheme which allows for the deletion of network acknowledgment packets from the receiving node to enable the connection to the first network. In this scheme TCP acknowledgments are deleted that belong to the same TCP connection in the packet queue, if the sequence number of the TCP acknowledgment in the queue is smaller than one of the most recently sent TCP acknowledgments by the receiving node.

The invention also describes a method of enqueueing and dequeueing network data packets from the network packet queue to reduce the number of packet retransmissions that occur in the network.

The present invention has a wide range of advantages for wireless communication standards and describes numerous design aspects, including but not limited to the following.

An aspect of the invention is to improve the IP handling performance of wireless networks.

Another aspect of the invention is to increase the efficiency of using the TCP/IP standard over IEEE 802.11 standard-based wireless networks.

Another aspect of the invention is to improve response times for IP communications over wireless networks.

Another aspect of the invention is to utilize otherwise wasted bandwidth within IEEE 802.11 wireless networks.

Another aspect of the invention is to alleviate the self-contention which can arise in IEEE 802.11 standard-based wireless networks.

Another aspect of the invention is to improve error recovery in IEEE 802.11 networks handling IP traffic.

Another aspect of the invention is to improve response times for IP communications over IEEE 802.11 wireless networks by reducing the number of retransmitted IEEE 802.11 frames.

Another aspect of the invention is to provide techniques which can be implemented on a variety of wireless communication standards, such as IEEE 802.11 standards including 802.11a, 802.11b, 802.11g and future standards similar to the IEEE 802.11 specification.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a layer topology for the conventional OSI standard for a computer communication architecture.

FIG. 2 is a layer topology for the conventional IEEE 802 standard for a computer communication architecture.

FIG. 3 is a block diagram of a typical usage example where a conventional IEEE 802.11 network connects to an network based on TCP/IP.

FIG. 5 is a flowchart of a conventional frame transmission scheme for a IEEE 802.11 network.

FIG. 6 is a framing diagram showing a comparison of conventional transmission overhead for IEEE 802.11b and a 10Base-T network.

DETAILED DESCRIPTION OF THE INVENTION

Figure 4:
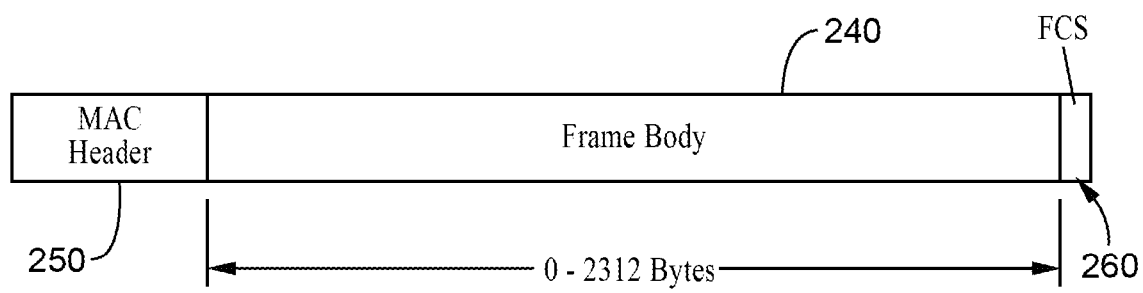
FIG. 4 is a framing structure for a conventional IEEE 802.11 frame format.

Referring more specifically to the drawings, for illustrative purposes the present invention is embodied in the apparatus generally shown in FIG. 7 through FIG. 16. It will be appreciated that the apparatus may vary as to configuration and as to details of the parts, and that the method may vary as to the specific steps and sequence, without departing from the basic concepts as disclosed herein.

The present invention provides for optimizing the IEEE 802.11 network protocol for TCP/IP data transfers. The present invention incorporates a number of schemes which may be implemented separately or in combinations to the IEEE 802.11 protocol MAC layer for improving performance when handling TCP/IP. As is common in the conventional art, the IEEE 802.11 network is typically connected to an Ethernet, DSL line, or perhaps a cable modem that generally conforms to a 1500 byte MTU. Home router devices are being increasingly deployed which incorporate both an IEEE 802.11 access point function and an IP router function. However, when IEEE 802.11 and a wired network are interconnected by such a device, an MTU that exceeds 1500 bytes cannot be used due to the restrictions imposed by the IP layer. The present invention maintains a 1500 byte MTU size to conform to the IP architecture. However, the present invention can utilize all 2312 bytes which are available in the IEEE 802.11 frame. The extra 800 bytes are not used for carrying the IP packet, but are used for retaining forward error correction (FEC) information or checksum information provided by the present invention.

The present invention implements a partial retransmission scheme by dividing an IP packet into multiple data blocks and adds FEC or checksum information for the data blocks. The FEC or checksum information is stored in the extra 800 byte space in the IEEE 802.11 frame. In one embodiment of the present invention, ACK frames are utilized by the receiver to feedback the information regarding unrecoverable or corrupted data blocks in received frames. The sender tries to transmit only unrecoverable or corrupted blocks and not to retransmit entire frames. The retransmitted blocks are piggybacked in the next frame by using the extra 800 bytes space in the IEEE 802.11 frame. In the partial retransmission scheme of the present invention, the number of frames used for retransmission will not be increased, since retransmitted blocks are piggybacked in subsequent frames. It should be appreciated that IEEE 802.11 standard wireless networks are subject to a substantially large amount of overhead for frame transmission in comparison with wired networks.

FIG. 6 as described previously compares the overhead for a 10 Mbps Ethernet, 10Base-T, associated with transmission of data 410, with the overhead for IEEE 802.11b, associated with transmission of data 420. It is apparent from the figure that IEEE 802.11b has to wait 50 μS for carrier sensing, while 10Base-T waits for only 9.6 μS. Moreover, IEEE 802.11 takes 192 μS to transmit the preamble and the header information of a frame, while 10base-T takes only 6 μS for the preamble. Since IEEE 802.11b utilizes the mechanism of ACK frames to confirm that frames arrived successfully, the same overhead is incurred each time an ACK frame 421 is transmitted at the receiver side. Thus, when using IEEE 802.11 the total overhead to complete frame transmission can be approximately 500 μS.

The present invention provides a method referred to herein as the "partial scheme" for reducing the number of packets needed for retransmission, wherein a portion of this high transmission overhead is mitigated. Thus, the present invention increases the throughput and reduces frame transmission delays.

Figure 7:
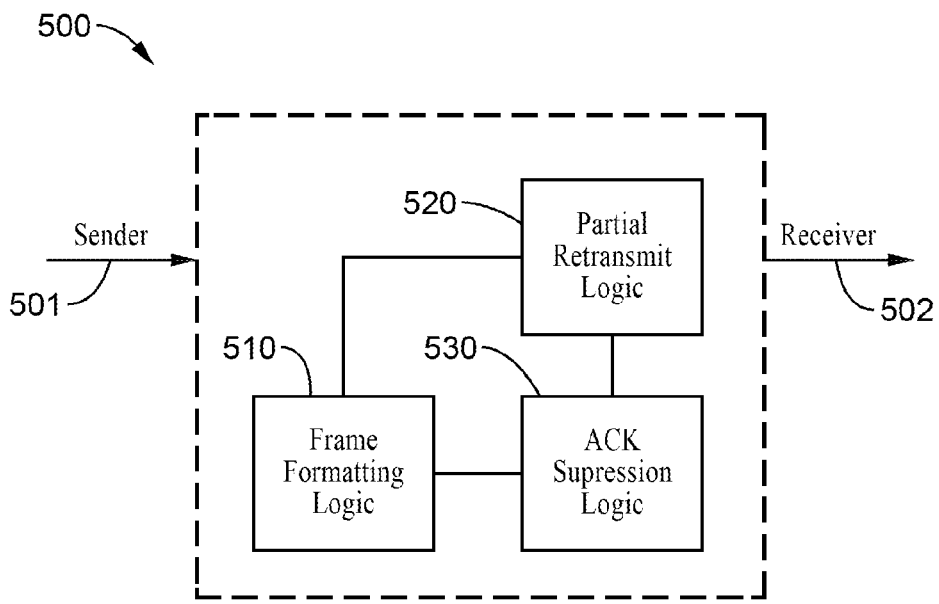
FIG. 7 is a block diagram of a data transfer optimizer according to an aspect of the present invention.

FIG. 7 is an embodiment of a data transfer optimizer 500 receiving 501 packets from a sender 501 processing them and transmitting 502 to a receiver. The data transfer optimizer comprises frame formatting logic 510, partial retransmission logic 520 and ACK suppression logic 530. The frame formatting logic 510 preferably formats IEEE 802 based network packet frames to be communicated on an IP network. The partial retransmission logic 520 enables retransmissions of corrupt or unrecoverable data blocks from one packet frame, from a sending node to a receiving node, in a subsequent packet frame by a piggybacking scheme that enables the present invention to utilize IEEE 802 data packets in an IP network. The ACK suppression logic 530 checks packets in a TCP packet queue to delete duplicate and unnecessary packets for TCP connection.

In one embodiment of the present invention, a TCP ACK suppression scheme is implemented to check the queue in an IEEE 802.11 network interface periodically. TCP ACKs found in the queue which have minor impact on performance are deleted. Since TCP uses a cumulative acknowledgment method, deleting some TCP ACKs hardly impacts communication. TCP ACK suppression reduces the number of ACKs transmitted in bursts and alleviates self-contention in TCP communication.

Figure 8:
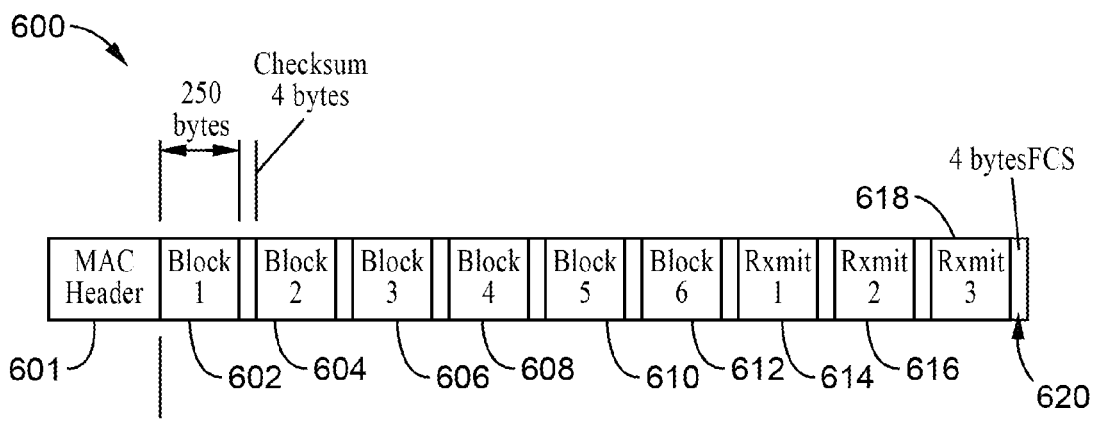
FIG. 8 is a framing structure for an embodiment of an exemplary IEEE 802.11 frame format according to an aspect of the present invention.

FIG. 8 is an illustration of an IEEE 802.11 framing structure which may be utilized within the present invention, comprising frame 600 divided into multiple blocks 601-618. The embodiment is illustrated by way of example with a frame 600 that is approximately 2312 bytes with a variable length frame body and a 4 byte FCS 620. The frame 600 comprises 9 data blocks 602-618 that are each 250 bytes in length. The first 6 blocks are used for the original payload and the remaining blocks are used for retransmission. The frame format shown in the figure assumes the use of a 4 byte FEC 620 and checksum algorithms, such as RS(255,251) or CRC-32. Another algorithm, Adler-32, which uses a 4 byte checksum algorithm can be broken when used for small size data and does not provide optimal results. Other known checking algorithms and methods may be utilized without departing from the teachings of the present invention. The present invention allows the use of other formats for data block lengths and other FEC/checksum algorithms insofar as they can be accommodated within the 2312 byte frame body. It should be appreciated that the technique is generally applicable to all frame lengths.

Figure 9:
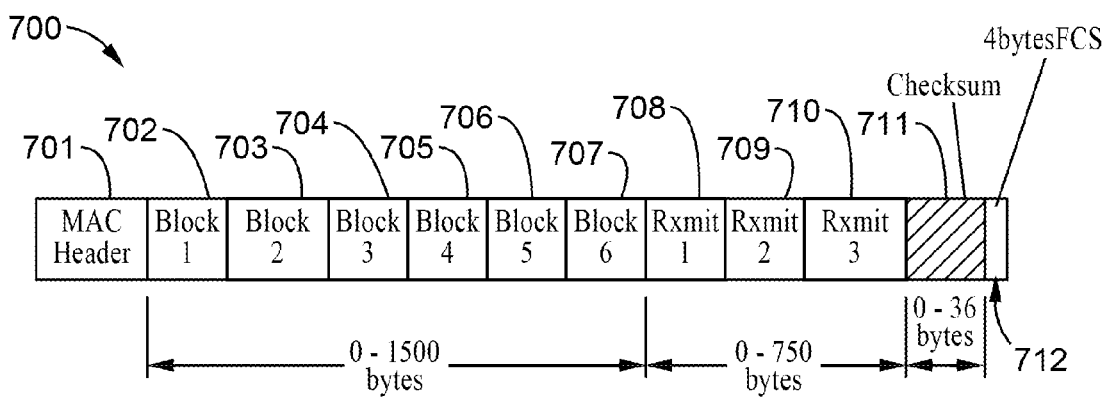
FIG. 9 is a framing structure of another exemplary embodiment of a IEEE 802.11 frame format according to an aspect present invention.

FIG. 9 is a framing structure for another IEEE 802.11 framing format according to the invention. As seen in the figure, the frame format is preferably an IEEE 802.11 frame comprising frame 700 that is divided into multiple blocks 701-712. It should be noted that the frame format shown in FIG. 9 does not require a frame reassembling process, as required for the frame format in FIG. 8. In one typical example the maximum frame body size of 2312 bytes, for a frame 700 can be split into nine (9) data blocks 702-710 which are each 250 bytes in length and each having a four (4) byte FCS 712. The first six (6) data blocks are utilized for the original payload and the remainder are utilized for retransmission purposes. It should be appreciated that the present invention may be utilized with other frame lengths, data block formats and forms of error checking or correction mechanisms that fit within the frame body.

In one embodiment of the present invention, the forward error correction (FEC) or checksum scheme is utilized to increase reliability during frame transmission. It should be appreciated that utilizing FEC allows recovery of data from bit errors, while the use of checksums only provides for determining whether data is corrupt. However, since FEC requires more complex calculation, it would be difficult to implement FEC as an efficient software module. Therefore, it is preferred that all or at least portions of the FEC be implementation with electronic hardware. In one embodiment, a hardware module is preferably utilized for the FEC as a more optimal solution, although hardware costs and power consumption would be expected to increase to some extent. On the contrary, checksum schemes can be easily implemented as software modules, since they utilize a low overhead calculation algorithm.

Partial retransmission is implemented within the invention to reduce the amount of wait time the sender experiences when waiting for acknowledgment to confirm the receipt of a successful transmission. In one embodiment, an IEEE 802.11 frame is formatted into multiple blocks wherein the method attempts to retransmit only unrecoverable or corrupt blocks. The receiver checks each block in the received frame by using the forward error correction (FEC) or checksum information attached to the frame and determines if the block is correct or recoverable. If all the blocks in the frame are correct, the receiver sends back an ACK to the sender. If some blocks in the frame are corrupt or unrecoverable, the receiver tries to send back a partial ACK which contains information on error blocks. However, the receiver may send back a negative ACK which requires a retransmission of the entire frame, or it does not send back any ACK which also causes retransmission of the entire frame at the sender. Under the following two conditions the inventive method preferably generates a negative ACK back to the sender:

(1) number of corrupt blocks exceeds a threshold value; and (2) retransmitted blocks are corrupted.

When a sender receives a Partial ACK according to the invention, it piggybacks unreceived data blocks on the data frames which will be transmitted next. If it receives a Negative ACK or does not receive an ACK, it retransmits the entire data frame as long as it does not exceed the maximum retransmission time.

Figure 10:
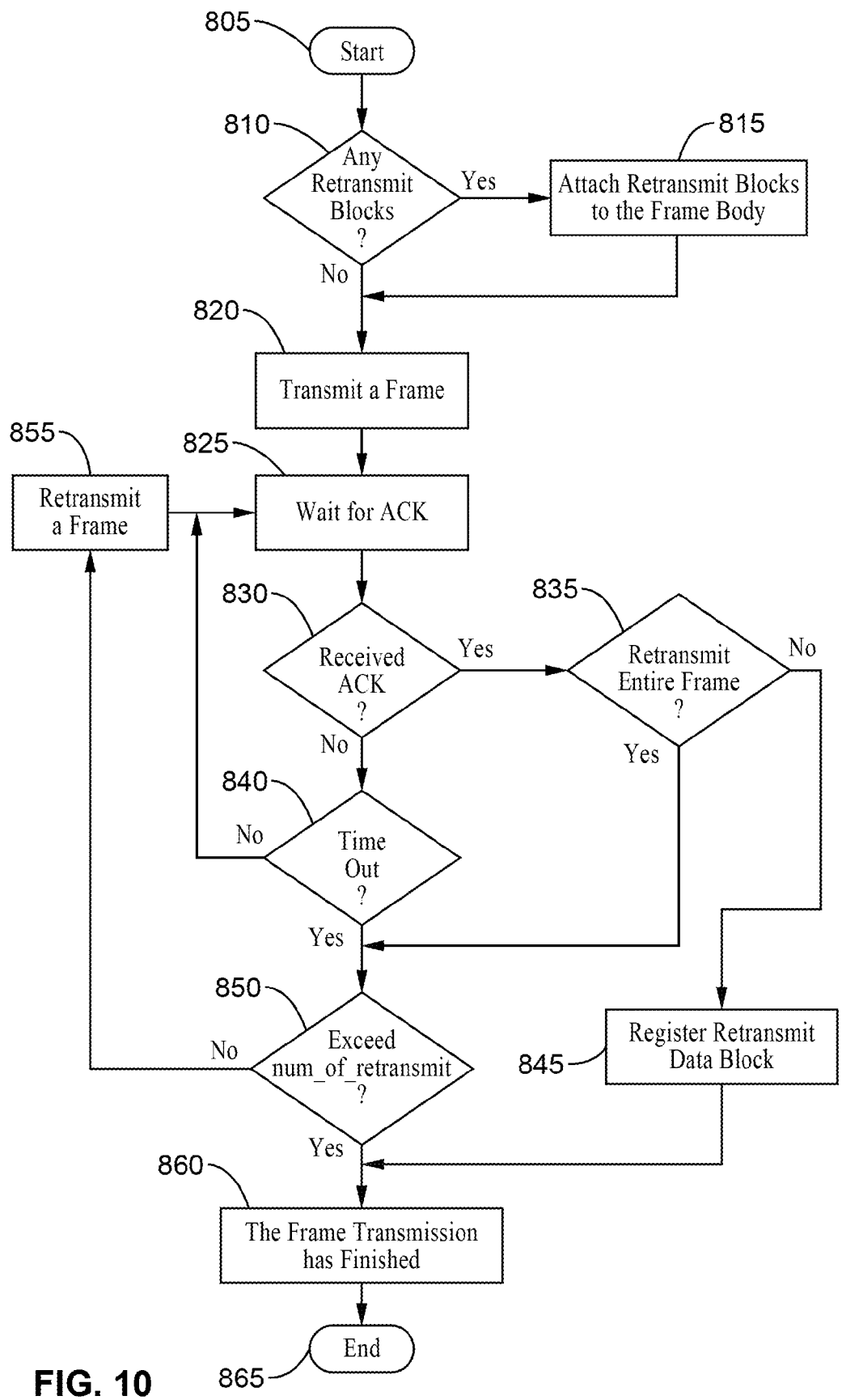
FIG. 10 is a flowchart of a frame retransmission scheme according to an aspect of the present invention.

FIG. 10 illustrates one embodiment of the partial retransmission scheme of the present invention. The scheme is executed when a frame is transmitted by a sender 805. At block 810, the sender checks to determine if any retransmit blocks are contained in the frame being transmitted. If there are retransmit blocks, the sender attaches the transmit blocks 815 to the frame body and continues. The sender transmits the frame 820 in either case.

Next, the sender waits for an acknowledgment 825 from the receiver to confirm the successful receipt of the transmitted frame. If the sender receives 830 an acknowledgment from the receiver, it determines 835 whether to retransmit an entire frame. However, if the sender does not receive an acknowledgment or a transmitted frame, the sender checks 840 to see if the transmission has timed out. If the transmission has not timed out, the sender returns and continues to wait 825 for a receipt acknowledgment. If the transmission has timed out, the sender determines whether the time out exceeds the maximum retransmission times 850 for the particular frame.

If the sender is unable to retransmit an entire frame as detected in flowchart block 835, the sender registers to retransmit 845 the data block. If the sender is able to retransmit the entire frame, the sender determines whether the retransmit exceeds the maximum retransmission time as per block 850 to continue transmission of the frame. A registered retransmit data block or a retransmission that has not exceeded the maximum retransmission time enables the sender to complete the successful transmission 860 of the frame.

Figure 11:
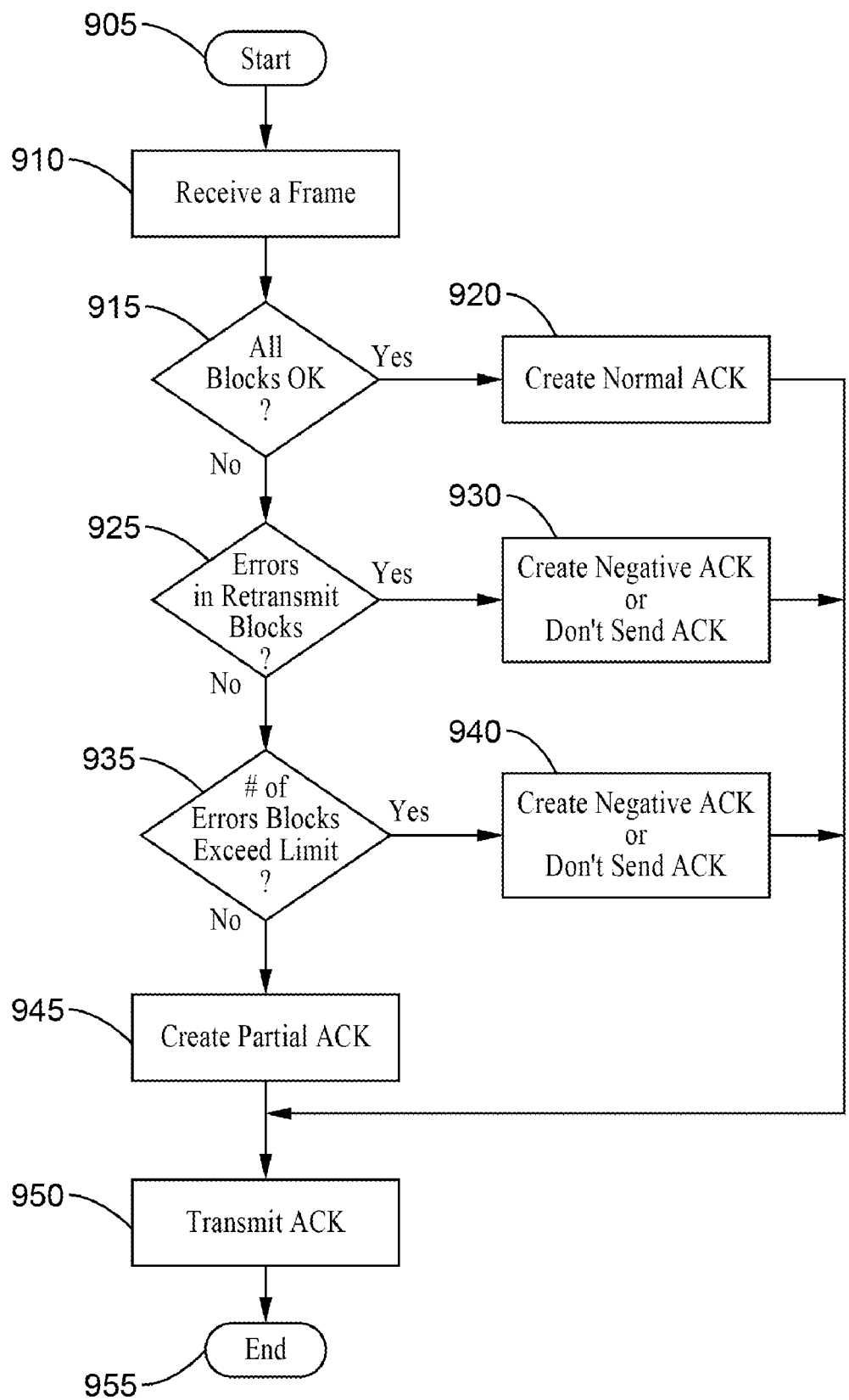
FIG. 11 is a flowchart of a frame receipt scheme according to an aspect of the present invention.

FIG. 11 illustrates an embodiment of a receipt scheme for the present invention. Processing is shown starting at block 905, and when the receiver receives a frame at block 910, it begins performing multiple checks. The first check is to determine as per block 915, whether all the blocks in the frame are uncorrupted. If the blocks are uncorrupted, the receiver creates a normal acknowledgment message in block 920 to the sender. If all the blocks received by the receiver are corrupted, the receiver checks to determine whether there are any errors in the retransmitted blocks in block 925. If there are errors in the retransmitted blocks, the receiver composes a negative acknowledgment message or does not send an acknowledgment to the sender as in block 930.

If no errors exist in the retransmitted blocks, the receiver then checks to determine 935 whether the number of error blocks exceed a threshold for corrupt blocks. If the number of corrupt blocks exceeds the threshold, the receiver creates a negative acknowledgment or no acknowledgment to the sender in block 940. If the number of corrupt blocks does not exceed the threshold, the receiver creates a partial acknowledgment in block 945 and transmits the acknowledgment in block 950 to end 955 the transmission of the frame.

TCP ACK suppression is also implemented within the present invention comprising a packet suppression scheme for suppressing packets queued in the network queue. Every network device incorporates a queue in the implementation of its network interface. If received data from higher layers cannot be transmitted immediately, it is stored within the queue in the network interface and delayed until it can be transmitted. The present invention checks this queue periodically and if there are TCP ACKs that hardly affect communication performance, it deletes these packets. This TCP ACK suppression scheme reduces the number of ACKs transmitted in bursts. Thus, it can alleviate self-contention in TCP communications.

The TCP acknowledgment scheme of the present invention is accumulative, since it reports only how much of the data has accumulated. This means that TCP ACK specified the sequence number of the next byte that the receiver expects to receive. Therefore, when there are multiple TCP ACKs in the queue, deleting some of them hardly impacts TCP communication as long as the last ACK is received. The present invention utilizes this characteristic of TCP communication and accordingly deletes ACKs within the queue.

TCP suppression might affect the slow start algorithm which is applied in the early stages of TCP communication. However, this side effect will not be significant when transferring data at high speeds. TCP ACK suppression according to the invention can speed up TCP data transfer about 500 μS per each TCP ACK deleted. For example, if the RTT of TCP communication is on the order of 10 mS and TCP connection lasts 10 seconds, TCP ACK suppression can speed TCP by 500 mS, because it will delete about 1000 TCP ACKs during the data transfer. On the contrary, the delay caused by deleting TCP ACK is around 50 mS. This delay can be minor compared to the performance improvement provided by TCP ACK suppression. If a TCP connection lasts less than about 1 second, TCP ACK suppression will not be particularly effective. However, TCP ACK suppression is very effective for use with longer TCP connection times.

The TCP ACK suppression scheme of the present invention checks packets in the queue to delete unnecessary packets for TCP connections. If unnecessary TCP ACKs are found in the queue that belong to the same TCP connection, they can be eliminated. The present scheme determines that ACKs are not necessary if both of the following conditions are met:

(1) acknowledgment sequence number of the TCP ACK in the queue is smaller than a most recently sent TCP ACK; and
(2) TCP ACK does not have special flags (SYN, RST, FIN, URG) set in the header.

It is important to mention that if the ACK sequence number in the TCP ACK in the queue is equal to the one in the most recent TCP ACK, the ACK should not be deleted. These kinds of duplicate ACKs might indicate packet losses in the network. Deleting duplicate ACKs may suppress fast retransmit algorithms which can significantly impact loss recovery, and may result in a time out that may severely degrade TCP performance. If packet processing performance in the host is sufficiently high, the packets may only be stored in the queue for a very short period of time. In that case, fewer opportunities exist to apply TCP ACK suppression. To solve this problem, the present invention allows the use of a simple algorithm that creates unperceivable delays (e.g., 0.01 sec) during queue processing to increase the opportunities for TCP ACK suppression according to the invention.

Figure 12:
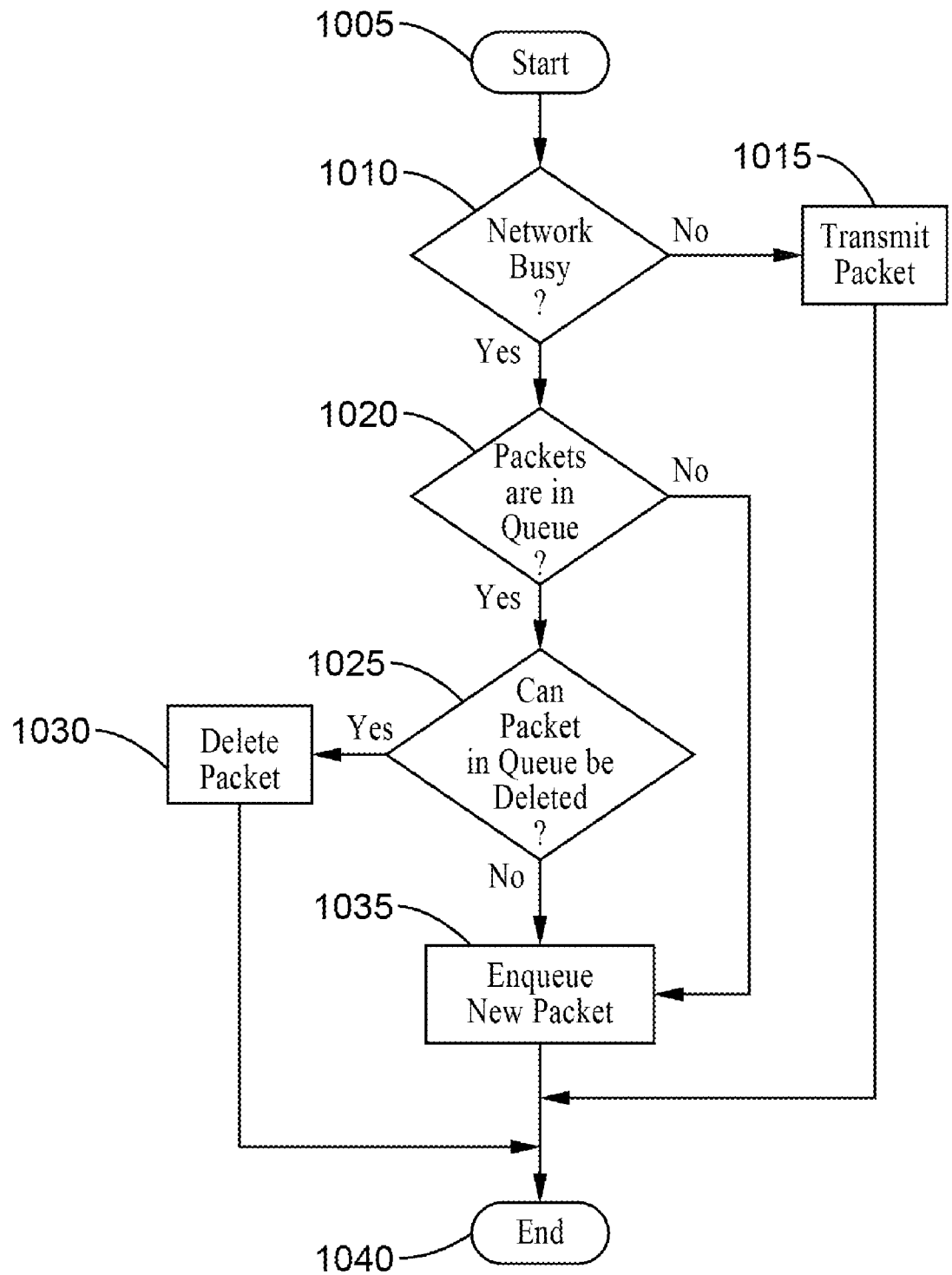
FIG. 12 is a flowchart of an enqueuing scheme according to an aspect of the present invention.

FIG. 12 illustrates a frame enqueueing scheme of the invention. After processing starts at block 1005, acknowledgment suppression logic checks at block 1010 to determine if the network is busy. If the network is busy, the suppression logic determines in block 1020 whether any packets are in the queue. If the network is not busy per the check in block 1010, the sender transmits the packet in block 1015 and ends suppression processing.

If packets exist in the network queue, the suppression logic determines whether packets in the queue could be deleted as per block 1025. If there are no packets in the queue to be deleted, new packets are queued in the network queue as per block 1035.

If packets can be deleted from the queue, as determined at block 1025, then they are deleted as per block 1030. If the packets in the queue cannot be deleted, the packet is queued in block 1035 and the packet suppression scheme ends in block 1040.

Figure 13:
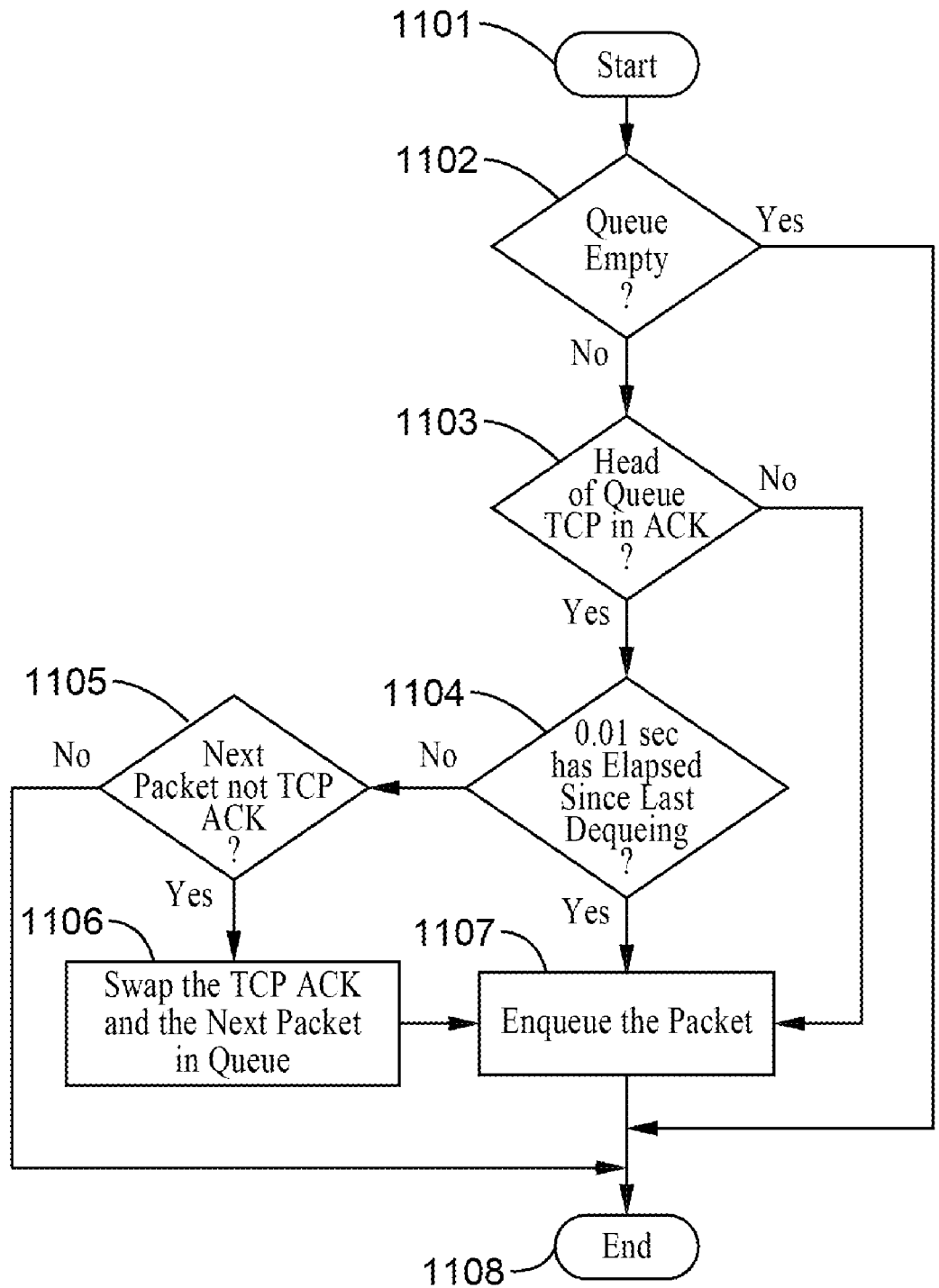
FIG. 13 is a flowchart of a dequeueing scheme according to an aspect of the present invention.

FIG. 13 illustrates a packet dequeueing scheme of the invention starting at block 1101. In this packet dequeueing scheme, the suppression logic of the present invention removes duplicate packets from the packet queue to reduce redundancy in the packet queue in order to improve the retransmit rate of packets in the invention.

Packet suppression logic checks the packet queue in block 1102 to determine whether the queue is empty. If the queue is empty, the dequeueing process ends. If the queue is not empty, the suppression logic determines in block 1103 whether the packet at head of the packet queue is a TCP ACK packet. If the head of the packet queue is a TCP ACK packet, the suppression logic determines at block 1104 whether the elapsed time since the last dequeueing process is at a predetermined threshold. In one embodiment of the present invention, the predetermined threshold is about 0.01 seconds (10 mS). If the head packet is not a TCP ACK packet, the suppression logic dequeues the packet and completes the suppression process.

If the head packet is a TCP ACK packet and the last dequeueing process has not been more than the predetermined threshold, the suppression logic checks to determine at block 1105 if the next packet in the queue is not a TCP ACK packet. If the next packet in the queue is not a TCP ACK packet, the TCP ACK and the next packet are swapped in block 1106 to dequeue the packet in block 1107. On the other hand, if the next packet is a TCP ACK packet, the packet is retained and the suppression processing ends in block 1108.

Figure 14:
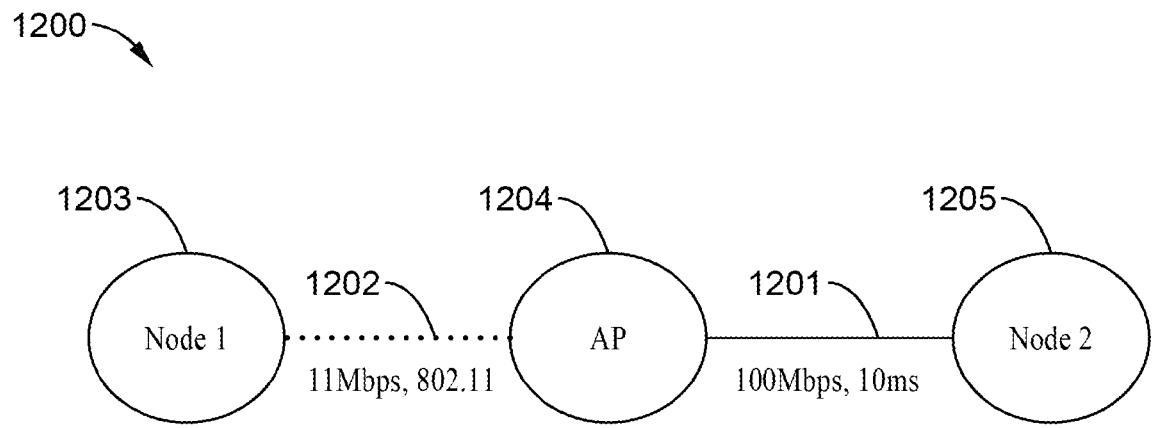
FIG. 14 is a node diagram of an exemplary IEEE 802 network coupled to a high speed network.

FIG. 14 is a simulated network example 1200 according to the invention. Simulated network 1200 comprises a high speed network 1201, such as an Ethernet network, and a wireless network 1202, such as with an IEEE 802.11 protocol. Node 1 (1203) is connected to the IEEE 802.11 network 1202 and Node 2 (1205) is connected to a 100 Mbps Ethernet 1201. The IEEE 802.11 network and the 100 Mbps Ethernet are linked to the IEEE 802.11b access point (AP) 1204. In this scenario Node 1 (1203) sends data to Node 2 (1205) for 10 seconds utilizing a communication protocol such as TCP or UDP. The throughput of the through connection is then measured. The BER of the IEEE 802.11 network is then changed from 0 to 104 to evaluate error resiliency. In one embodiment, the MTU is set at 1500 bytes for both the IEEE 802.11 network and the 100 Mbps Ethernet.

Figure 15:
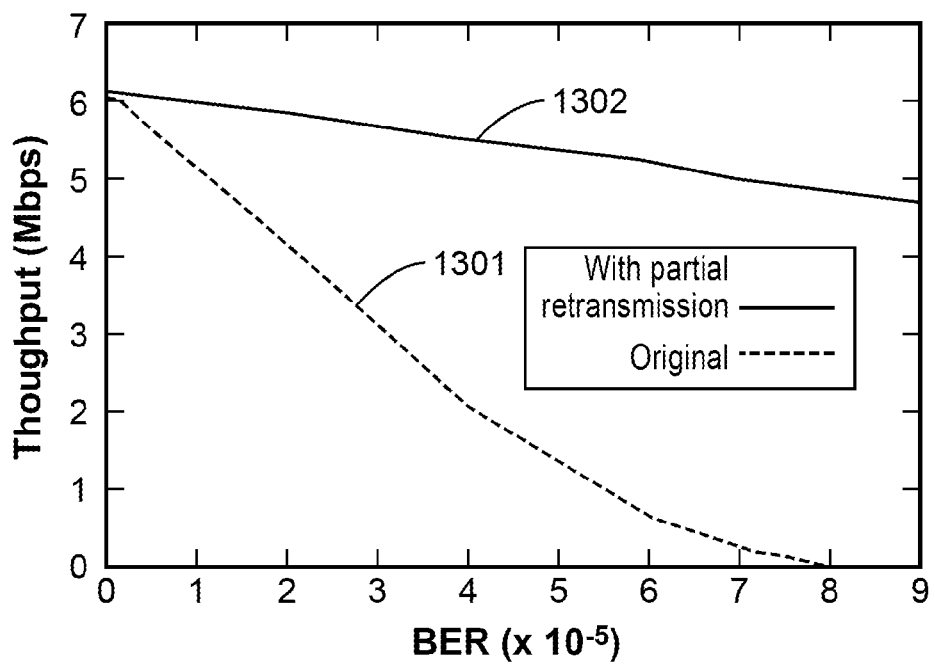
FIG. 15 is a graphics depiction of a throughput analysis of one embodiment of the partial retransmission scheme of the present invention.
Figure 16:
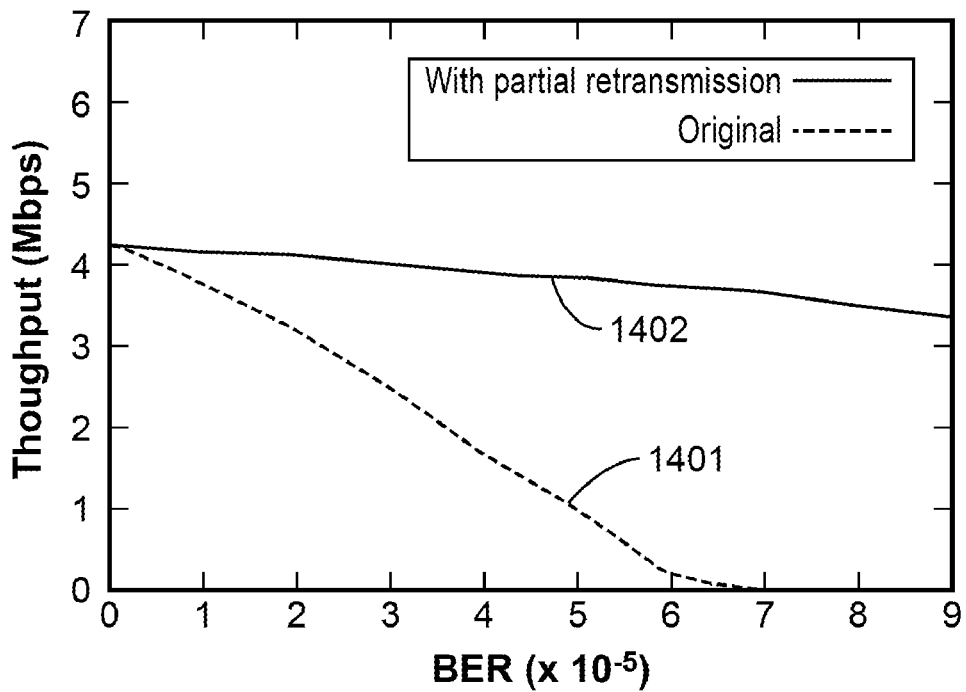
FIG. 16 is a graphical depiction of a TCP throughput analysis for a partial retransmission of one embodiment of the present invention.

FIG. 15 and FIG. 16 are graphical depictions of an exemplary throughput analysis of UDP and TCP with respect to BER of one embodiment of a partial retransmission process of the present invention. As shown in FIG. 15, graph 1301 represents throughput of a conventional transmission of packets and graph 1302 represents the throughput of a retransmission utilizing the partial retransmission logic of the present invention. As illustrated in FIG. 15, the performance of UDP with the partial retransmission scheme of the present invention is compared with a retransmission scheme without the benefit of the partial retransmission logic of the present invention. Graph 1301 indicates the throughput of UDP using the original IEEE 802.11 MAC. With the original IEEE 802.11, the throughput is degraded to almost zero when the BER is 8.0×10 E−5. Graph 1302 indicates the throughput of UDP using the IEEE 802.11 MAC incorporating the partial retransmission scheme of the present invention. With the partial retransmission scheme, the network can transmit at nearly 5 Mbps when the BER is 8.0×10 E−5.

In FIG. 16, the broken line 1401 indicates the throughput for TCP using the original IEEE 802.11 MAC and the solid line indicates the throughput of TCP with the partial retransmission scheme. Since TCP is affected by self-contention, the throughput of TCP is lower than that of UDP. In one embodiment, TCP attains nearly 4 Mbps throughput when BER is 1 e−04.

Figure 17:
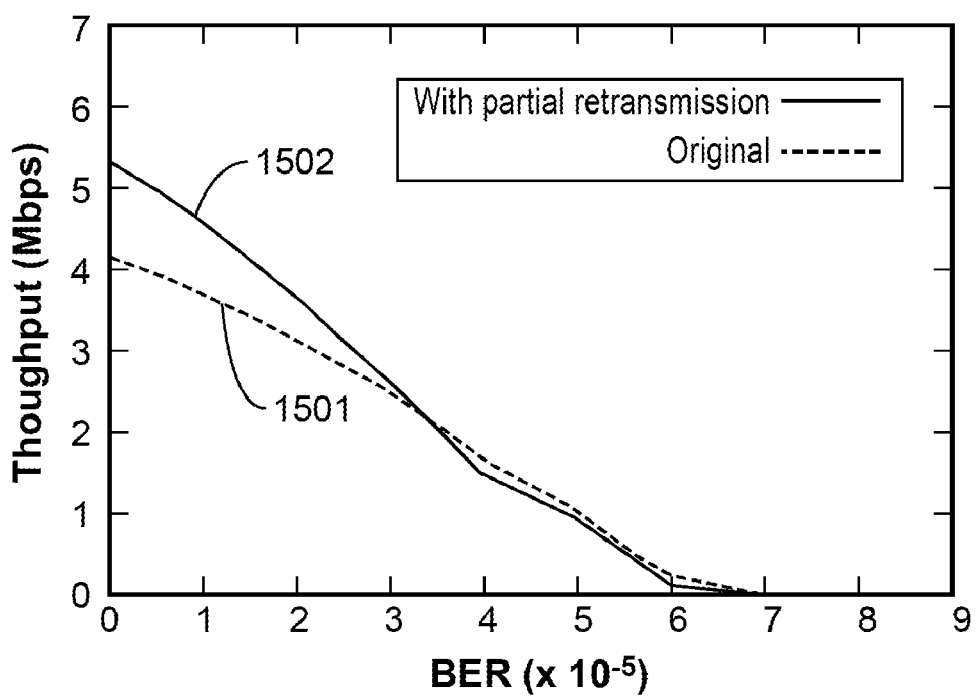
FIG. 17 is a graphical depiction of TCP throughput analysis of an ACK suppression of one embodiment of the present invention.
Figure 18:
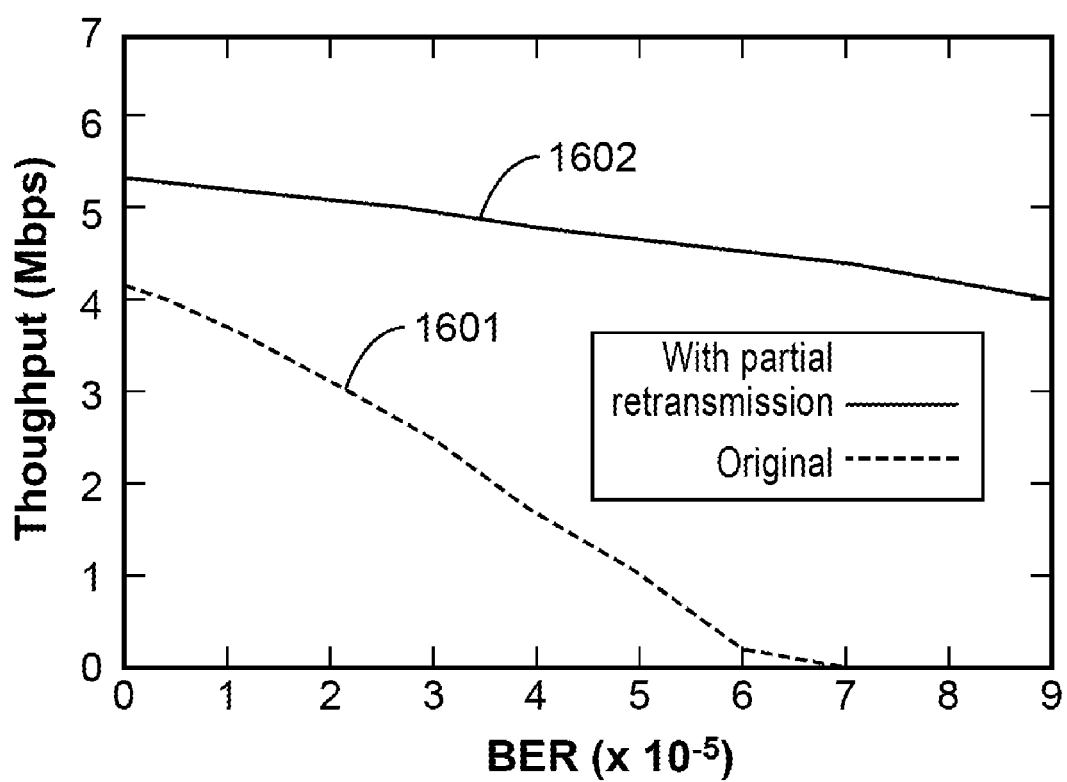
FIG. 18 is a graphics depiction of a TCP throughput analysis of a partial retransmission and ACK suppression of one embodiment of the present invention.

FIG. 17 and FIG. 18 are graphical illustrations of an exemplary throughput analysis of UDP and TCP with respect to BER utilizing an embodiment of the acknowledgment suppression scheme of the present invention. As shown in FIG. 17, the throughput of TCP with the TCP ACK suppression scheme of the present invention improves the throughput by about 30% when BER is 0 as shown by the solid line 1502 compared to the original implementation of the IEEE 802.11 MAC as shown by the broken line 1501.

Because the partial transmission scheme and the TCP ACK suppression scheme are completely independent, these two schemes can be simultaneously used. FIG. 18 is an exemplary depiction of a TCP throughput analysis in which both the partial retransmission scheme and the ACK suppression scheme of the present invention are used to analyze TCP throughput with respect to BER. In the graphics shown in FIG. 18, it is clear that the TCP throughput is increased by using both the partial retransmission and the ACK suppression schemes of the present invention. From the graphics shown in FIG. 18, it is clear that the partial retransmission scheme therefore increases throughput in a very lossy environment, while the existing IEEE 802.11 MAC scheme performs poorly. The partial retransmission scheme can be applied to all IP communications.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for performing Transmission Control Protocol/Internet Protocol (TCP/IP) data packet transfers over a wireless network, comprising:
   a network interface configured for wireless communication over a network according to a TCP/IP layered communication protocol;
   a media access communication (MAC) layer within said network interface;
   wherein an IP data packet structure is used within a wireless data packet frame of a media access communication (MAC) layer;
   wherein said wireless data packet frame is larger than said IP data packet structure which leaves additional bytes within the wireless data packet frame, which is formatted into multiple blocks; and
   means for optimizing data transfers as controlled from within said MAC layer by formatting network packets for Internet Protocol (IP) transmission and then using said additional bytes for wireless transmission of Forward Error Correction (FEC) and checksums, and for retransmitting blocks when performing partial packet retransmissions in response to receiving a partial ACK which contains information on error blocks from a receiver;
   wherein said Internet Protocol (IP) protocol defines a Maximum Transmission Unit (MTU) size; and wherein said partial packet retransmissions comprise dividing each Internet Protocol (IP) packet into multiple data blocks and adding Forward Error Correction (FEC) or checksum information for the data blocks within said additional bytes available in the wireless data packet frame which are not available in the Maximum Transmission Unit (MTU) of the IP protocol and retransmitting blocks by attaching the error blocks within said additional bytes within the wireless data packet frame.

2. An apparatus as recited in claim 1, wherein the suppression of unnecessary packet acknowledgements comprises deleting a portion of the packet acknowledgments (ACKs), belonging to the same TCP connection and stored within the queue of the network interface, which are determined to be unnecessary to sustain proper network performance.

3. An apparatus for performing Transmission Control Protocol/Internet Protocol (TCP/IP) data packet transfers over a wireless network, comprising:
- a network interface configured for wireless communication over a network according to a TCP/IP layered communication protocol;
- a media access communication (MAC) layer within said network interface; and
- at least one optimization process executing within said MAC layer and configured for formatting and processing network packets;
- wherein said optimization processing comprises performing partial packet retransmission, in response to receiving a partial ACK which contains information on error blocks from a receiver, by dividing each Internet Protocol (IP) packet into multiple data blocks and adding Forward Error Correction (FEC) or checksum information for the data blocks within additional bytes defined within a wireless data packet frame which are not utilized in IP protocol frames, and retransmitting blocks by attaching the error blocks within said additional bytes within the wireless data packet frame;
- wherein a Maximum Transmission Unit (MTU) of a first number of bytes is maintained to conform to number of bytes in an Internet Protocol (IP) packet, with a second number of bytes utilized within a wireless data packet frame;
- wherein said second number of bytes exceeds said first number of bytes; and
- wherein the additional bytes within said second number of bytes are not utilized for carrying the IP packet, but are utilized for retaining forward error correction (FEC) information or checksum information and for partial packet retransmission.

4. An apparatus as recited in claim 3, further comprising suppressing ACKs within an ACK suppression system by deleting a portion of the packet acknowledgments (ACKs), belonging to the same TCP connection and stored within a TCP packet queue of the network interface, which are determined to be unnecessary to sustain proper network performance.

5. An apparatus as recited in claim 3, wherein said partial packet retransmission system is configured for dividing a network packet frame into a plurality of data blocks including a first plurality of retransmission data blocks for retransmissions between a sender and a receiver.

6. An apparatus as recited in claim 3:
- wherein said partial packet retransmission system is configured for dividing a network packet frame into a plurality of data blocks including a first plurality of retransmission data blocks for retransmissions between a sender and a receiver; and
- wherein said plurality of data blocks further includes a second plurality of payload data blocks configured for transmitting payload information from said sender to said receiver.

7. An apparatus as recited in claim 3:
- wherein said partial packet retransmission system is configured for dividing a network packet frame into a plurality of data blocks including a first plurality of retransmission data blocks for retransmissions between a sender and a receiver;
- wherein said plurality of data blocks further includes a second plurality of payload data blocks configured for transmitting payload information from said sender to said receiver; and
- wherein said plurality of data blocks further comprise checksum data for recovering data bit errors in said plurality of data blocks for increasing reliability of the transmission of said plurality of data blocks.

8. An apparatus as recited in claim 3:
- wherein said partial packet retransmission system is configured for dividing a network packet frame into a plurality of data blocks including a first plurality of retransmission data blocks for retransmissions between a sender and a receiver;
- wherein said plurality of data blocks further includes a second plurality of payload data blocks configured for transmitting payload information from said sender to said receiver;
- wherein said plurality of data blocks further comprise checksum data for recovering data bit errors in said plurality of data blocks for increasing reliability of the transmission of said plurality of data blocks; and
- wherein said checksum data is implemented in a software scheme.

9. An apparatus as recited in claim 3:
- wherein said partial packet retransmission system is configured for dividing a network packet frame into a plurality of data blocks including a first plurality of retransmission data blocks for retransmissions between a sender and a receiver;
- wherein said plurality of data blocks further includes a second plurality of payload data blocks configured for transmitting payload information from said sender to said receiver;
- wherein said plurality of data blocks further comprises forward error correction (FEC) data configured for determining whether said data blocks are corrupted or unrecoverable; and
- whereby reliability of transmitting the plurality of said data blocks is increased.

10. An apparatus as recited in claim 3:
- wherein said partial packet retransmission system is configured for dividing a network packet frame into a plurality of data blocks including a first plurality of retransmission data blocks for retransmissions between a sender and a receiver;
- wherein said plurality of data blocks further includes a second plurality of payload data blocks configured for transmitting payload information from said sender to said receiver;
- wherein said plurality of data blocks further comprises forward error correction (FEC) data configured for determining whether said data blocks are corrupted or unrecoverable;

whereby reliability of transmitting the plurality of said data blocks is increased; and wherein said forward error correction is at least partially performed by electronic hardware.

11. An apparatus as recited in claim 3, further comprising:
suppressing ACKs within an ACK suppression system by deleting a portion of the packet acknowledgments (ACKs), belonging to the same TCP connection and stored within a TCP packet queue of the network interface, which are determined to be unnecessary to sustain proper network performance; and wherein the ACK suppression system is configured to modify said MAC layer to allow ACK packet suppression in the network.

12. An apparatus as recited in claim 3, further comprising:
suppressing ACKs within an ACK suppression system by deleting a portion of the packet acknowledgments (ACKs), belonging to the same TCP connection and stored within a TCP packet queue of the network interface, which are determined to be unnecessary to sustain proper network performance;

wherein the ACK suppression system is configured to modify said MAC layer to allow ACK packet suppression in the network; and wherein said ACK suppression system speeds transferring network data for each ACK packet deleted in the TCP packet queue in the network.

13. An apparatus as recited in claim 3, further comprising:
suppressing ACKs within an ACK suppression system by deleting a portion of the packet acknowledgments (ACKs), belonging to the same TCP connection and stored within a TCP packet queue of the network interface, which are determined to be unnecessary to sustain proper network performance;

wherein the ACK suppression system is configured to modify said MAC layer to allow ACK packet suppression in the network; and wherein said ACK suppression system is configured to piggyback unreceived data blocks transmitted in a first of said plurality of data blocks partially transmitted within a second of said plurality of data blocks transmitted subsequent to the first when the sender receives a partial acknowledgment from the receiver.

14. An apparatus as recited in claim 3, further comprising:
suppressing ACKs within an ACK suppression system by deleting a portion of the packet acknowledgments (ACKs), belonging to the same TCP connection and stored within a TCP packet queue of the network interface, which are determined to be unnecessary to sustain proper network performance;

wherein the ACK suppression system is configured to modify said MAC layer to allow ACK packet suppression in the network;

wherein said ACK suppression system is configured to piggyback unreceived data blocks transmitted in a first of said plurality of data blocks partially transmitted within a second of said plurality of data blocks transmitted subsequent to the first when the sender receives a partial acknowledgment from the receiver; and wherein said ACK suppression system is configured for having said sender retransmit the entire data frame if said sender receives a negative acknowledgment from the receiver for a transmitted data frame, and as long as the retransmission does not exceed a maximum retransmission time.

15. A method of optimizing Transmission Control Protocol/Internet Protocol (TCP/IP) data packet transfer over a wireless network, comprising:
communicating wirelessly between a sender and receiver according to a TCP/IP layered communication protocol;

dividing a network packet frame into a plurality of data blocks;

wherein an IP data packet structure is used within a wireless data packet frame of a media access communication (MAC) layer;

wherein said wireless data packet frame is larger than said IP data packet structure which leaves additional bytes within the wireless data packet frame, which is formatted into multiple blocks;

wherein said Internet Protocol (IP) protocol defines a Maximum Transmission Unit (MTU) size; and partially retransmitting untransmitted data blocks in said plurality of data blocks corresponding to the network packet frame, in response to receiving a partial ACK which contains information from a receiver on which blocks from the packet to retransmit, by attaching specific blocks from the packet within additional bytes of space in a wireless frame which are not available in the Maximum Transmission Unit (MTU) size utilized with the Internet Protocol (IP) protocol;

wherein a Maximum Transmission Unit (MTU) of a first number of bytes is maintained to conform to number of bytes in an Internet Protocol (IP) packet, with a second number of bytes utilized within a wireless data packet frame;

wherein said second number of bytes exceeds said first number of bytes; and wherein the additional bytes within said second number of bytes are not utilized for carrying the IP packet, but are utilized for retaining forward error correction (FEC) information or checksum information and for partial packet retransmission.

16. A method as recited in claim 15, further comprising checking each of the plurality of data blocks in the network packet frame using a forward error correction (FEC) information scheme attached to the network packet frame to determine whether a particular data block in the plurality of data blocks is correct or recoverable.

17. A method as recited in claim 15, further comprising:
checking each of the plurality of data blocks in the network packet frame using a forward error correction (FEC) information scheme attached to the network packet frame to determine whether a particular data block in the plurality of data blocks is correct or recoverable; and wherein said checking is configured for sending an acknowledgment by said receiving node to said sending node with reference to a transmitted network packet frame in response to said plurality of data blocks being correct or recoverable.

18. A method as recited in claim 15, further comprising:
checking each of the plurality of data blocks in the network packet frame using a forward error correction (FEC) information scheme attached to the network packet frame to determine whether a particular data block in the plurality of data blocks is correct or recoverable; and wherein said checking is configured for sending a partial acknowledgment from said receiving node to said sending node with respect to a transmitted network packet frame, in response to said plurality of data blocks being corrupt or unrecoverable.

19. A method as recited in claim 15, further comprising:
checking each of the plurality of data blocks in the network packet frame using a forward error correction (FEC) information scheme attached to the network packet frame to determine whether a particular data block in the plurality of data blocks is correct or recoverable;
wherein said checking is configured for sending a partial acknowledgment from said receiving node to said sending node with respect to a transmitted network packet frame, in response to said plurality of data blocks being corrupt or unrecoverable; and
wherein said checking is configured for transmitting a negative acknowledgment from said receiving node to said sending node to request retransmission of an entire network packet frame, in response to determining that said number of corrupt data blocks in said plurality of data blocks exceeds a threshold and said retransmitted data blocks are corrupt.

20. A method as recited in claim 15, further comprising:
checking each of the plurality of data blocks in the network packet frame using a forward error correction (FEC) information scheme attached to the network packet frame to determine whether a particular data block in the plurality of data blocks is correct or recoverable;
wherein said checking is configured for sending a partial acknowledgment from said receiving node to said sending node with respect to a transmitted network packet frame, in response to said plurality of data blocks being corrupt or unrecoverable; and
wherein said sending of said partial acknowledgment comprises piggybacking the unrecoverable or the corrupt data blocks in a subsequent network packet frame transmission from said sending node to said receiving node.

21. A method as recited in claim 15, further comprising:
checking each of the plurality of data blocks in the network packet frame using a forward error correction (FEC) information scheme attached to the network packet frame to determine whether a particular data block in the plurality of data blocks is correct or recoverable;
wherein said checking is configured for sending a partial acknowledgment from said receiving node to said sending node with respect to a transmitted network packet frame, in response to said plurality of data blocks being corrupt or unrecoverable;
wherein said sending of said partial acknowledgment comprises piggybacking, in the network data frame, the unrecoverable or the corrupt data blocks in a subsequent network packet frame transmission from said sending node to said receiving node; and
wherein upon said sending node receiving a partial acknowledgment from said receiving nodes, said sending node piggybacks unreceived data blocks on the data frames which will be transmitted next.

22. A method as recited in claim 15,
checking each of the plurality of data blocks in the network packet frame using a forward error correction (FEC) information scheme attached to the network packet frame to determine whether a particular data block in the plurality of data blocks is correct or recoverable;
wherein said checking is configured for sending a partial acknowledgment from said receiving node to said sending node with respect to a transmitted network packet frame, in response to said plurality of data blocks being corrupt or unrecoverable;
wherein said sending of said partial acknowledgment comprises piggybacking, in the network data frame, the unrecoverable or the corrupt data blocks in a subsequent network packet frame transmission from said sending node to said receiving node;
wherein upon said sending node receiving a partial acknowledgment from said receiving nodes, said sending node piggybacks unreceived data blocks on the data frames which will be transmitted next; and
wherein said sending node retransmits the entire data frame if the maximum retransmission time is not exceeded when said sending node receives a negative frame transmission acknowledgment.

23. A method as recited in claim 15, further comprising:
suppressing portions of said plurality of data block transmit acknowledgments between a sending node and a receiving node by deleting a portion of the transmit acknowledgments (ACKS);
wherein said acknowledgment suppression system is configured to periodically check the network queue and to delete unnecessary packet acknowledgments in the network queue.

24. A method as recited in claim 15, further comprising:
suppressing portions of said plurality of data block transmit acknowledgments between a sending node and a receiving node by deleting a portion of the transmit acknowledgments (ACKS);
wherein said acknowledgment suppression system is configured to periodically check the network queue and to delete unnecessary packet acknowledgments in the network queue; and
wherein said packet acknowledgments comprise transport control protocol (TCP) acknowledgments.

25. A method as recited in claim 15, further comprising:
suppressing portions of said plurality of data block transmit acknowledgments between a sending node and a receiving node by deleting a portion of the transmit acknowledgments (ACKS);
wherein said acknowledgment suppression system is configured to periodically check the network queue and to delete unnecessary packet acknowledgments in the network queue;
wherein said packet acknowledgments comprise transport control protocol (TCP) acknowledgments; and
wherein said acknowledgment suppression system is configured for reducing the number of acknowledgments transmitted in bursts, thereby mitigating self-contention within the transport control protocol (TCP) communication.

26. A method as recited in claim 15, further comprising:
suppressing portions of said plurality of data block transmit acknowledgments between a sending node and a receiving node by deleting a portion of the transmit acknowledgments (ACKS);
wherein said acknowledgment suppression system is configured to periodically check the network queue and to delete unnecessary packet acknowledgments in the network queue;
wherein said packet acknowledgments comprise transport control protocol (TCP) acknowledgments;
wherein said acknowledgment suppression system is configured for reducing the number of acknowledgments transmitted in bursts, thereby mitigating self-contention within the transport control protocol (TCP) communication; and
wherein said acknowledgment suppression system is configured to not delete the acknowledgment packet from the transport control protocol (TCP) packet queue when it is determined that said acknowledgement sequence number in the transport control protocol (TCP) packet queue is equal to the sequence number in the most recent TCP acknowledgment.

27. A network data transfer optimization system for optimizing network packet communications between two non-identical networks, the system comprising:

a network packet data formatting unit configured for formatting network packets into frames for transmission from a first network comprising a Transport Control Protocol/Internet Protocol (TCP/IP) based network to a second network comprising a wireless network;

wherein an internet protocol (IP) data packet structure is used within a wireless data packet frame of a media access communication (MAC) layer;

wherein said wireless data packet frame is larger than said IP data packet structure which leaves extra bytes within the wireless data packet frame for packet retransmission, which is formatted into multiple blocks;

a network packet retransmission unit configured for partially retransmitting unreceived data blocks in the network packets, in response to receiving a partial ACK which contains information from a receiver on which blocks from the packet to retransmit, by piggybacking the data within extra bytes which are available in a frame under a wireless protocol and not used in the TCP/IP network between said first network and said second network; and a network packet suppression unit configured for deleting a number of unnecessary network acknowledgment packets belonging to the same connection and stored on the packet queue and corresponding to network packets transmitted between said first network and said second network to enable a network connection to said first network ;

wherein a Maximum Transmission Unit (MTU) of a first number of bytes is maintained to conform to number of bytes in an Internet Protocol (IP) packet, with a second number of bytes utilized within a wireless data packet frame;

wherein said second number of bytes exceeds said first number of bytes; and wherein the additional bytes within said second number of bytes are not utilized for carrying the IP packet, but are utilized for retaining forward error correction (FEC) information or checksum information and for partial packet retransmission.

28. A system as recited in claim 27, further comprising a network packet suppression unit configured for deleting a portion of unnecessary network acknowledgment packets belonging to the same connection and stored on the packet queue and corresponding to network packets transmitted between said first network and said second network to enable a network connection to said first network.

29. A system as recited in claim 27, wherein said network packet data formatting unit is configured for formatting a data packet of said first network into a plurality of data blocks for transmission to said second network.

30. A system as recited in claim 27:
wherein said network packet data formatting unit is configured for formatting a data packet of said first network into a plurality of data blocks for transmission to said second network; and
wherein said plurality of data blocks includes checksum data for determining whether a particular data block is corrupted or uncorrupted.

31. A system as recited in claim 27:
wherein said network packet data formatting unit is configured for formatting a data packet of said first network into a plurality of data blocks for transmission to said second network;
wherein said plurality of data blocks includes checksum data for determining whether a particular data block is corrupted or uncorrupted; and
wherein said plurality of data blocks further includes forward error correction (FEC) data configured for recovering data from error bits in the plurality of data blocks.

32. A wireless network, comprising:
a first network having a first network transport protocol comprising a Transport Control Protocol/Internet Protocol (TCP/IP);
a second network having a second network transport protocol comprising a wireless network;
wherein an internet protocol (IP) data packet structure is used within a wireless data packet frame of a media access communication (MAC) layer;
wherein the wireless data packet frame is larger than said IP data packet structure which leaves extra byte space within the wireless data packet frame, which is formatted into multiple blocks;
a network data transfer optimization system coupled to a media access control layer of said second network and configured for optimizing data transfer between network nodes in said first network and said second network;
wherein said optimization system utilizes ACK frames, and the sending of partial ACKs, by the receiver to feedback information on unrecoverable or corrupted data blocks, wherein upon receipt the sender can limit transmission to a retransmission of unrecoverable or corrupted blocks within the packet without retransmitting the entire data packet frame; and
wherein said retransmitted unrecoverable or corrupted blocks are attached in a subsequent frame by using extra byte space in the wireless data packet frame which is not utilized in the IP frame;
wherein a Maximum Transmission Unit (MTU) of a first number of bytes is maintained to conform to number of bytes in an Internet Protocol (IP) packet, with a second number of bytes utilized within a wireless data packet frame;
wherein said second number of bytes exceeds said first number of bytes; and
wherein the additional bytes within said second number of bytes are not utilized for carrying the IP packet, but are utilized for retaining forward error correction (FEC) information or checksum information and for partial packet retransmission.

33. A wireless network as recited in claim 32, wherein said first network is an Ethernet network.

34. A wireless network as recited in claim 32, wherein said data transfer optimization system comprises a network data formatting unit configured for formatting network data packet frames transmitted in said second network.

35. A wireless network as recited in claim 32:
wherein said data transfer optimization system comprises a network data formatting unit configured for formatting network data packet frames transmitted in said second network; and
wherein said data transfer optimization system further comprises a network data packet retransmission unit configured for retransmitting partial data packets corresponding to the network data packet frames transmitted from a sending node to a receiving node when the network data packet frames include corrupt or unrecoverable data blocks.

36. A wireless network as recited in claim 32,
wherein said data transfer optimization system comprises a network data formatting unit configured for formatting network data packet frames transmitted in said second network; and
wherein said data transfer optimization system further comprises a network data packet transmission acknowledgment suppression system configured for removing duplicate or unnecessary data packets from a network data queue to enable a transport control protocol (TCP) connection.

37. A wireless network as recited in claim 32:
wherein said data transfer optimization system comprises a network data formatting unit configured for formatting network data packet frames transmitted in said second network;
wherein said data transfer optimization system further comprises a network data packet retransmission unit configured for retransmitting partial data packets corresponding to the network data packet frames transmitted from a sending node to a receiving node when the network data packet frames include corrupt or unrecoverable data blocks; and
wherein said network data packet retransmission unit is configured for dividing up said network data packet frame into data blocks including a media access control layer header having information to enable the data packet frame to be transmitted between said first network and said second network.

38. A wireless network as recited in claim 32:
wherein said data transfer optimization system comprises a network data formatting unit configured for formatting network data packet frames transmitted in said second network;
wherein said data transfer optimization system further comprises a network data packet retransmission unit configured for retransmitting partial data packets corresponding to the network data packet frames transmitted from a sending node to a receiving node when the network data packet frames include corrupt or unrecoverable data blocks;
wherein said network data packet retransmission unit is configured for dividing up said network data packet frame into data blocks including a media access control layer header having information to enable the data packet frame to be transmitted between said first network and said second network; and
wherein said data blocks further comprise checksum information for improving reliability of data transmission between said first network and said second network.

39. A wireless network as recited in claim 32:
wherein said data transfer optimization system comprises a network data formatting unit configured for formatting network data packet frames transmitted in said second network;
wherein said data transfer optimization system further comprises a network data packet transmission acknowledgment suppression system configured for removing duplicate or unnecessary data packets from a network data queue to enable a transport control protocol (TCP) connection; and
wherein said network data packet transmission acknowledgment suppression system is configured to not delete an acknowledgement from the packet queue if its sequence number being transmitted in a transport control protocol (TCP) acknowledgment is equal to the packet in the most recent TCP acknowledgment.

* * * * *